(12) United States Patent
Laurin et al.

(10) Patent No.: US 11,414,729 B2
(45) Date of Patent: Aug. 16, 2022

(54) COMPOSITE MATERIAL HAVING IMPROVED MECHANICAL PROPERTIES AT ELEVATED TEMPERATURES

(71) Applicant: UNIVERSITE DU QUEBEC A CHICOUTIMI, Chicoutimi (CA)

(72) Inventors: Jean-Alain Laurin, Chicoutimi (CA); Nicholas C. Parson, Kingston (CA); Mario Roux, Chicoutimi (CA); Xiao-Guang Chen, Saguenay (CA); Kun Liu, Saguenay (CA)

(73) Assignee: UNIVERSITE DU QUEBEC A CHICOUTIMI, Chicoutimi (CA)

( * ) Notice: Subject to any disclaimer, the term of this patent is extended or adjusted under 35 U.S.C. 154(b) by 244 days.

(21) Appl. No.: 15/570,972

(22) PCT Filed: Apr. 29, 2016

(86) PCT No.: PCT/CA2016/050498
§ 371 (c)(1),
(2) Date: Oct. 31, 2017

(87) PCT Pub. No.: WO2016/176766
PCT Pub. Date: Nov. 10, 2016

(65) Prior Publication Data
US 2018/0163286 A1 Jun. 14, 2018

Related U.S. Application Data

(60) Provisional application No. 62/155,556, filed on May 1, 2015.

(51) Int. Cl.
*C22C 21/08* (2006.01)
*C22C 32/00* (2006.01)
(Continued)

(52) U.S. Cl.
CPC ............ *C22C 21/08* (2013.01); *C22C 1/1068* (2013.01); *C22C 1/1094* (2013.01); *C22C 21/00* (2013.01);
(Continued)

(58) Field of Classification Search
CPC ..... C22C 21/08; C22C 1/1068; C22C 1/1094; C22C 32/0057; C22C 2001/1047; C22C 21/06; C22C 21/00
See application file for complete search history.

(56) References Cited

U.S. PATENT DOCUMENTS 4,605,440 A 8/1986 Halverson et al.
6,638,376 B2 10/2003 Hasegawa et al.
(Continued)

FOREIGN PATENT DOCUMENTS

CA 2912021 A1 12/2014
CN 101956102 A 1/2011
(Continued)

OTHER PUBLICATIONS

"UNS A93018" ASM International. (Year: 2008).*
(Continued)

*Primary Examiner* — George Wyszomierski
*Assistant Examiner* — Janell C Morillo
(74) *Attorney, Agent, or Firm* — Banner & Witcoff, Ltd.

(57) ABSTRACT

The present disclosure concerns composite material having improved strength at elevated temperatures. The composite material comprises a matrix of an aluminum alloy (comprising, in weight percent, Si 0.05-0.30, Fe 0.04-0.6, Mn 0.80-1.50, Mg 0.80-1.50 and the balance being aluminum and unavoidable impurities) as well as particles of a filler material dispersed within the matrix. The matrix can optionally comprise Cu and/or Mo. In some embodiments, the composite material comprises, as a filler material, $B_4C$ as
(Continued)

well as an additive selected from the group consisting of Ti, Cr, V, Nb, Zr, Sr, Sc and any combination thereof. The present disclosure also provides processes for making such composite materials.

22 Claims, 2 Drawing Sheets

(51) Int. Cl.
*C22C 21/00* (2006.01)
*C22C 21/06* (2006.01)
*C22C 1/10* (2006.01)
*C22F 1/04* (2006.01)
*C22C 1/04* (2006.01)

(52) U.S. Cl.
CPC .......... *C22C 21/06* (2013.01); *C22C 32/0057* (2013.01); *C22F 1/04* (2013.01); *C22C 1/0416* (2013.01); *C22C 2001/1047* (2013.01)

(56) References Cited

U.S. PATENT DOCUMENTS

| | | | |
|---|---|---|---|
| 6,638,377 | B2 | 10/2003 | Koyama et al. |
| 7,562,692 | B2 | 7/2009 | Fortin et al. |
| 7,562,962 | B2 | 7/2009 | Silverbrook |
| 7,732,059 | B2 | 6/2010 | Ren et al. |
| 7,781,071 | B2 | 8/2010 | Parson et al. |
| 8,025,748 | B2 | 9/2011 | Parson et al. |
| 2001/0025676 | A1 | 10/2001 | Taguchi et al. |
| 2002/0007881 | A1 | 1/2002 | Daaland et al. |
| 2003/0102060 | A1 | 6/2003 | Daaland et al. |
| 2005/0106410 | A1 | 5/2005 | Jiang et al. |
| 2006/0090872 | A1* | 5/2006 | Fortin ............... C22C 1/026 164/97 |
| 2013/0209307 | A1 | 8/2013 | Haynes, III et al. |
| 2014/0083569 | A1 | 3/2014 | Parson et al. |
| 2016/0153073 | A1 | 6/2016 | Parson et al. |
| 2016/0332219 | A1 | 11/2016 | Shu et al. |
| 2017/0260612 | A1 | 9/2017 | Janssen et al. |

FOREIGN PATENT DOCUMENTS

| | | | |
|---|---|---|---|
| CN | 103789599 | A | 5/2014 |
| CN | 103982711 | * | 8/2014 |
| CN | 104271289 | A | 1/2015 |
| EP | 1155157 | A1 | 11/2001 |
| EP | 1158063 | A1 | 11/2001 |
| EP | 1632955 | A1 | 3/2006 |
| EP | 1956107 | A1 | 8/2008 |
| EP | 2841610 | A1 | 3/2015 |
| EP | 3026134 | A1 | 6/2016 |
| JP | 2006316321 | A | 11/2006 |
| WO | 9918250 | A1 | 4/1999 |
| WO | 2004038050 | A2 | 5/2004 |
| WO | 2013133976 | A1 | 9/2013 |
| WO | 2013133978 | A1 | 9/2013 |
| WO | 2014/075194 | A1 | 5/2014 |
| WO | 2014/201565 | A1 | 12/2014 |

OTHER PUBLICATIONS

"Balco Alloy 3004.00". ASM International (Year: 2000).*
CN 103982711 machine translation (Year: 2014).*
Davis, J.R. "Aluminum and Aluminum Alloys." Alloying: Understanding the Basics, pp. 351-383. ASM International. DOI:10.1361/autb2001p351 (Year: 2001).*
Jul. 11, 2016—International Search Report and Written Opinion of PCT/CA2016/050498.
Suarez, C.E., "Light Metals 2012", John Wiley & Sons, May 11, 2012, p. 456.
Aug. 21, 2019—(RU) Search Report—App 2017137742—Eng Tran.
Sep. 9, 2019—(RU) Office Action—App 2017137742—Eng Tran.
Nov. 30, 2018—Supplemetary European Search Report and Written Opinion of EP 16788987.
Jan. 11, 2019—(CN) Office Action—App 2016800248818—English Translation.
Feb. 21, 2020—(JP) Office Action—App 2018-507758—Eng Trans.
Microstructure, elevated-temperature mechanical properties and creep resistance of dispersoid-strengthened Al—Mn—Mg 3xxx alloys with varying Mg and Si contents, Li et al., journal, 12 pages, journal homepage: www.elsevier.com/locate/msea; Materials Science & Engineering A 708 (2017) 383-394; Department of Applied Science, University of Quebec at Chicoutimi, Saguenay, QC, Canada G7H 2B1.
May 13, 2021—(IN) Examination Report—App 201737038019—Eng Trans.
Lloyd; Particle reinforced alumiinium and magnesium matrix composites; article; 23 pages; International Materials Reviews 1994 vol. 39 No. 1.

* cited by examiner

COMPOSITE MATERIAL HAVING IMPROVED MECHANICAL PROPERTIES AT ELEVATED TEMPERATURES

CROSS-REFERENCE TO RELATED APPLICATIONS

This application is a U.S. National Stage application under 35 U.S.C. § 371 of International Application PCT/CA2016/050498 (published as WO 2016/176766 A1), filed Apr. 29, 2016, which claims priority from U.S. provisional application 62/155,556, filed on May 1, 2015, and the present application claims priority to and the benefit of both of these prior applications, each of which is incorporated herein in its entirety.

TECHNOLOGICAL FIELD

The present disclosure relates generally to an aluminum alloy having improved mechanical properties at elevated temperatures, as well as composite materials including the elements of the aluminum alloy as a matrix and/or as reaction products.

BACKGROUND

Aluminum matrix composites reinforced with boron carbide ($B_4C$) particulate are widely used for neutron absorption during storage of spent nuclear fuel. Extruded profiles are used in current dry storage systems and 6XXX series type alloys have been found to be suitable matrix materials providing compatibility with a liquid metal production route for the composite along with the extrusion process. Additionally, the metallurgy of the 6XXX alloy family allows the solution heat treatment step to be conducted during extrusion, allowing a process step to be removed. Further, at room temperature, the 6XXX alloy series can provide useful tensile properties of up to ~300 MPa YS and 350 MPa UTS due to the nano-sized β" Mg—Si precipitate structure developed during heat treatment.

However, service temperatures in dry storage of spent nuclear fuel can approach up to 250° C. and expected service times may be 40 years or more. As with most metallic materials, aluminum can soften at elevated temperature, due to increased dislocation mobility. However, for the Al—Mg—Si precipitation hardening system, a further and more dramatic loss in mechanical properties can occur above ~150° C., due to coarsening and dissolution of the precipitates of the age hardened microstructure. Such loss of mechanical properties may cause failure in the stability and/or integrity of containers manufactured using such alloys, when utilized at elevated temperatures for extended periods of time.

As indicated in WO2014/201565, $B_4C$-containing composite material can be provided as a direct-chilled (DC) cast and extruded product containing up to 20% (w/w) $B_4C$ exhibiting increased strength at elevated temperatures. In such $B_4C$-containing composite material, an Al—Mg—Si—Mn—Fe—Cu 6XXX type aluminum alloy is used as a matrix material. The final properties of the composite material rely on solutionising of available solute elements during the extrusion step and subsequent rapid quenching to retain those elements in solid solution. This requirement limits the extrusion operating window and productivity and the rapid quench requirement can induce shape distortion in the profile, which makes it difficult to meet required product dimensional tolerances.

One alternate composite material includes nano-sized oxide particles within an aluminum matrix to provide effective dispersoid strengthening at elevated temperatures such as described by U.S. Patent Application published under 2013/0209307. However, this material relies on a powder metallurgy route which is expensive due to the multiple processing steps of powder production, preform consolidation and extrusion. The oxide layer surrounding the powder particles is disrupted during extrusion consolidation to give the nano-sized distribution.

Another alternative teaches casting a composite material by stirring $B_4C$ particles and maintaining fluidity by adding 0.5-5% Ti (w/w) and by limiting Mg to <0.2% (w/w) until the $B_4C$ particles are mixed in (WO/2004/038050).

It would be highly desirable to be provided with composite material having increased strength at elevated temperatures during long-term exposure. It would also be desirable to be provided with an aluminum alloy which does not require press solutionising, to avoid distortion of the end-product. It would also be desirable that the matrix be suitable for conventional bulk liquid metallurgy, preferably DC casting and extrusion.

BRIEF SUMMARY

The present disclosure provides a composite material having increased mechanical properties (such as increased yield and/or tensile strengths) at elevated temperatures (such as at temperatures equal to or higher than 250° C.). The composite material comprises a matrix of an aluminum alloy (comprising Mn and Mg) as well as dispersed filler particles (such as $B_4C$ particles). The composite material can also comprise a reaction product coating at least partially at surface of the dispersed filler material.

In a first aspect, the present disclosure provides a composite material comprising: (a) a matrix of an aluminum alloy comprising, in weight percent: Si 0.05-0.30, Fe 0.04-0.6, Mn 0.80-1.50, Mg 0.80-1.50, and the balance being aluminum and unavoidable impurities; and (b) particles of a filler material dispersed within the matrix. In an embodiment, the filler material is a ceramic material, such as $B_4C$ particles, and the particles being at least partially coated with a product of a peritectic reaction between an additive and boron (B). The additive may be selected from the group consisting of Ti, Cr, V, Nb, Zr, Sr, Sc as well as any combination thereof. In another embodiment, the additive is Ti. In still another embodiment, the composite material is obtained by adding between 0.20 to 2.00 or about 1.0, in weight percent, of Ti to the matrix prior to the addition of the particles to the composite material. In still another embodiment, the matrix can further comprise Mo. In such embodiment, the Mo content of the matrix is 0.25 maximum (in weight percent). In yet another embodiment, the Si content of the matrix is 0.26 maximum or 0.2, in weight percent. In still another embodiment, the Fe content of the matrix is 0.40 maximum or 0.4, in weight percent. In yet another embodiment, the matrix further comprises Cu at a content, in the matrix, of 0.20 maximum, in weight percent. In an embodiment, the Cu content of the matrix is 0.14 maximum or 0.1, in weight percent. In yet another embodiment, the Mn content of the matrix is higher than 0.90 and/or equal to 1.0, in weight percent. In a further embodiment, the Mg content in the matrix is higher than 1.00 or equal to 0.9, in weight percent. In yet another embodiment, the filler material has a volume fraction of up to 20% (such as, for example 10.5%) in the composite material.

In another aspect, the present disclosure provides a method for making the composite material described herein. Broadly, the method comprises: (i) preparing a molten aluminum alloy by combining, in weight percent: Si 0.05-0.30, Fe 0.04-0.6, Mn 0.80-1.50, Mg 0.80-1.50, and the balance being aluminum and unavoidable impurities; (ii) adding particles of a filler material to the molten aluminum alloy to form a molten mixture having the filler material dispersed throughout the molten aluminum alloy; and (iii) casting the molten mixture to form the composite material. In an embodiment, the method comprises further homogenizing the as-cast billet to obtain an homogenized product. In yet another embodiment, the method can also comprise further extruding the as-cast billet or the homogenized product to obtain an extruded product. Optionally, the method can comprises further heat-treating the extruded product at a temperature between 350° C. and 400° C. and for a period of time between 2 to 30 hours. In an embodiment, the filler material is $B_4C$ and the method further comprises, in step (i), adding an additive is selected from the group consisting of Ti, Cr, V, Nb, Zr, Sr, Sc and any combination thereof to the molten aluminum alloy. In an embodiment, the additive is Ti and, in a further embodiment, the method further comprises adding between 0.20 to 2.00, in weight percent, of Ti to the molten aluminum alloy prior to the addition of the particles to the composite material. In still another embodiment, the method can further comprise adding Mo to the aluminum alloy. For example, the method can comprise adding a maximum of (e.g., up to) 0.25 Mo (in weight percent) to the molten aluminum alloy. In yet another embodiment, the method further comprises, at step (i), of adding 0.20 maximum, in weight percent, of Cu to the molten aluminum alloy. In still another embodiment, the method further comprises extruding the composite material to form an extruded product. In another embodiment, the method further comprises, prior to casting, stirring the molten mixture to wet the aluminum alloy to the particles of the filler material and to distribute the particles throughout the volume of the molten mixture. In an embodiment, the method further comprises, in step (ii), adding 20% volume fraction or less (such as, for example, 10.5% volume fraction) of the filler material to the composite material.

In yet another aspect, the present disclosure provides a composite material obtained by the method described herein. The composite material can be rolled or extruded. For example, the composite material can be an as-cast product (such as a direct-chill cast product), an extrusion billet (such as, for example, a round billet) or a rolling ingot (such as, for example, a square or rectangular billet, a sheet ingot, an extrusion, a foil, a strip, a plate as well as a sheet).

BRIEF DESCRIPTION OF THE DRAWINGS

Having thus generally described the nature of the invention, reference will now be made to the accompanying drawings, showing by way of illustration, a preferred embodiment thereof, and in which.

DETAILED DESCRIPTION

Figure 1:
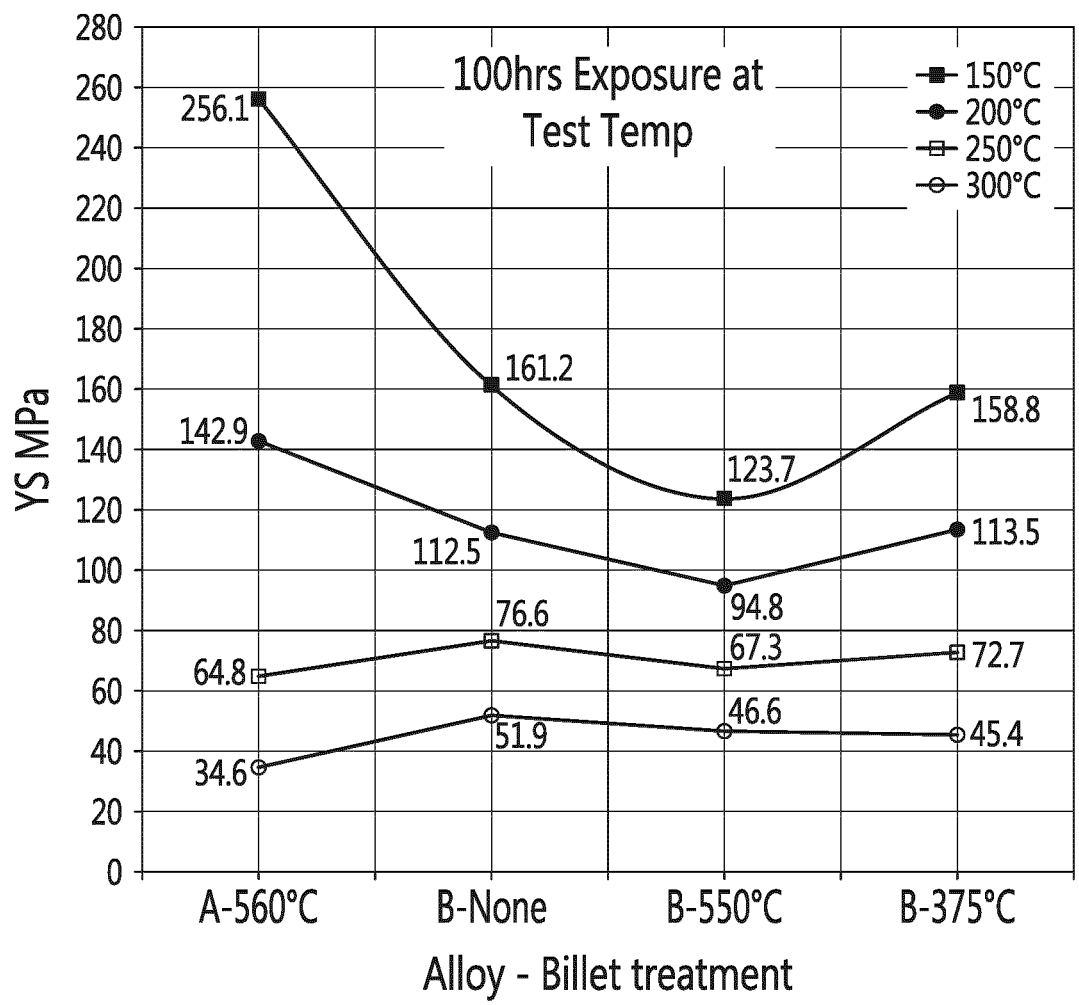
FIG. 1 provides a graphical representation of the yield strength (in MPa) as a function of alloy (A or B), billet treatment (from left to right: 4 hrs/560° C.; none, 4 hrs/550° C. or 24 hrs/375° C.) and temperature exposure for 100 hours (■: 150° C., ●: 200° C., □: 250° C., ○: 300° C.).

The present disclosure provides a composite material exhibiting increased mechanical properties at elevated temperatures relative to other composite materials, such as at least 250° C. or at least 300° C., including increased mechanical properties when exposed to such elevated temperatures for an extended period of time (e.g., 40 years or even 100 years). In some embodiments, the composite material may provide increased mechanical properties for exposure of up to 350° C. for extended periods of time. Alloy compositions and composite materials according to embodiments described herein may be utilized in various applications, including applications where high-temperature strength and/or extrudability is desirable. In one example, the alloy may be used as a matrix for $B_4C$ composite materials and other composite materials.

According to one embodiment, the aluminum alloy matrix of the composite material comprises, essentially contains or contains, in weight percent:
Si 0.05-0.30,
Fe 0.04-0.6,
Mn 0.80-1.50, and
Mg 0.80-1.50.

The balance of the aluminum alloy includes aluminum and unavoidable impurities. The unavoidable impurities may each be present at a maximum weight percent of 0.05, and the maximum total weight percent of the unavoidable impurities may be 0.15, in one embodiment. The alloy may include further alloying additions in additional embodiments (such as Cu and/or Mo for example).

As indicated above, the aluminum alloy matrix of the composite material has a Si (silicon) content equal to or lower than (e.g., up to) 0.3 (in weight percent). In an embodiment, the Si content of the aluminum alloy can be between about 0.05 and about 0.30, in weight percent. In the context of the present disclosure, the term "about" means that the related numerical value is part of a range that varies within standard experimental error. For example, the aluminum alloy matrix of the present disclosure can comprise at least about 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28 or 0.29 and/or at most about 0.30, 0.29, 0.28, 0.27, 0.26, 0.25, 0.24, 0.23, 0.22, 0.21, 0.20, 0.19, 0.18, 0.17, 0.16, 0.15, 0.14, 0.13, 0.12, 0.11, 0.10, 0.09, 0.08, 0.07 or 0.06 of Si (in weight percent). In some embodiments, the Si content of the aluminum alloy matrix can be equal to or lower than about 0.26 (in weight percent). In still another embodiment, the Si content of the aluminum alloy matrix can be about 0.2 (in weight percent). Si deliberate additions, in the presence of Mg, can increase the strength of the composite material at low temperatures (<250° C.), such as by precipitation hardening in forming Mg—Si precipitates. However, at temperatures of 250° C. or above, these Mg—Si particles coarsen and do not contribute strength. As such, in the context of the present disclosure, an upper limit should be placed on Si of 0.3 to prevent excessive formation of Mg—Si phases which otherwise would remove Mg from solid solution and decreases strength at 250° C. or above. Si can also combine with other additions, such as Fe and Mg, to form intermetallic phases which are thermally stable and can contribute to high temperature strength. As such, still in the context of the present disclosure, a minimum Si addition of 0.05 is required to promote formation of these intermetallic phases.

The aluminum alloy matrix of the composite material also has an Fe (iron) content equal to or lower than about 0.6 (in weight percentage). In an embodiment, the aluminum alloy matrix comprises up to about 0.6, 0.5, 0.4, 0.3, 0.2, 0.1, 0.09, 0.08, 0.07, 0.06 or 0.05 of Fe (in weight percent). In a further embodiment, the Fe content of the aluminum alloy matrix can be between about 0.04 to about 0.6, in weight percent. In still another embodiment, the aluminum alloy matrix can comprises at least about 0.04, 0.05, 0.06, 0.07, 0.08, 0.09, 0.1, 0.2, 0.3, 0.4 or 0.5 and/or at most about 0.6, 0.5, 0.4, 0.3, 0.2, 0.1, 0.09, 0.08, 0.07, 0.06 or 0.05 of Fe (in weight percent). In some embodiments, the Fe content of the aluminum alloy matrix can be equal to or lower than (e.g., up to) about 0.40 (in weight percent). In other embodiment, the Fe content of the aluminum alloy matrix is about 0.4 (in weight percent).

As indicated above, the aluminum alloy matrix of the composite material has a Mn (manganese) content between about 0.80 and about 1.50 (in weight percent). In an embodiment, the aluminum alloy comprises at least about 0.80, 0.85, 0.90, 0.95, 1.00, 1.05, 1.10, 1.15, 1.20, 1.25, 1.30, 1.35, 1.40 or 1.45 and/or at most about 1.50, 1.45, 1.40, 1.35, 1.30, 1.25, 1.20, 1.15, 1.10, 1.05, 1.00, 0.95, 0.90 or 0.85 of Mn (in weight percentage). In some embodiments, the Mn content of the aluminum alloy matrix is higher than about 0.90 (in weight percent) and equal to or lower than about 1.50 (in weight percent). In other embodiment, the Mn content of the aluminum alloy matrix is between about 1.00 and about 1.10 (in weight percent). In additional embodiment, the Mn content of the aluminum alloy matrix is about 1.0 (in weight percent). In some embodiments, it is expected that the Mn content decreases during batching and that additional Mn can be added to achieve a Mn-matrix content between about 0.80 and about 1.50.

As indicated above, the Mg (magnesium) content of the aluminum alloy matrix of the composite material comprises between about 0.80 to about 1.50 (in weight percent). In an embodiment, the aluminum alloy matrix comprises at least about 0.80, 0.85, 0.90, 0.95, 1.00, 1.05, 1.10, 1.15, 1.20, 1.25, 1.30, 1.35, 1.40 or 1.45 and/or at most about 1.50, 1.45, 1.40, 1.35, 1.30, 1.25, 1.20, 1.15, 1.10, 1.05, 1.00, 0.95, 0.90 or 0.85 of Mg (in weight percentage). In some embodiments, the Mg content of the aluminum alloy matrix is higher than about 1.00 (in weight percent) and equal to or lower than about 1.50 (in weight percent). In other embodiments, the Mg content of the aluminum alloy matrix is between about 0.90 and about 1.00 (in weight percent). In additional embodiment, the Mg content of the aluminum alloy matrix is about 0.9 (in weight percent).

Optionally, the aluminum alloy matrix of the composite material can further comprise or include a maximum of (e.g., up to) about 0.2 Cu (copper, in weight percentage). In some embodiments, the presence of Cu can increase the strength of the alloy, such as by forming precipitates which contribute to precipitation hardening. In other embodiments, the Cu content of the aluminum alloy matrix equal to or less than about 0.14 (in weight percent). In still another embodiment, the Cu content of the aluminum alloy matrix may be about 0.1 (in weight percent).

Optionally, the aluminum alloy matrix of the composite material can further comprise or include a maximum of about 0.25 Mo. In some embodiments, the presence of Mo can increase the elevated temperature strength of the alloy. In an embodiment, the aluminum alloy matrix of the composite material comprises up to about 0.25, 0.24, 0.23, 0.22, 0.21, 0.20, 0.19, 0.18, 0.17, 0.16, 0.15, 0.14, 0.13, 0.12, 0.11 or 0.10 Mo (in weight percent). In yet another embodiment, the aluminum alloy matrix of the composite material comprises up to about 0.25 Mo (in weight percent). In some embodiments, Mo can react with the filler material and, in such embodiment, up to 0.25 Mo is added to the aluminum alloy prior to the filler material. Still in such embodiment, the content of Mo in the matrix may be below 0.25. In a further embodiment, Mo is only being added to the aluminum alloy if Ti or another peritectic additive (such as Cr, V, Nb, Zr, Sr or Sc) is also being added to the aluminum alloy prior to the addition of the filler material.

The aluminum alloy matrix of the composite material may contain other alloying elements. For example, in one embodiment where the alloy is used as a matrix material for a composite containing $B_4C$ filler material, at least about 0.20, between about 0.20 to about 5.0, between about 0.20 to about 1.00 or about 1.0 Ti (titanium—all in weight percent) may be added to the liquid alloy, prior to the addition of the filler, to maintain fluidity (during a liquid mixing operation for example). When used as a monolithic alloy (e.g., in the absence of a filler material such as, for example, $B_4C$), up to about 0.05 Ti and/or about 0.01 B (boron—in weight percent) may be added for use as a grain refiner. In the composite material, this deliberate addition of Ti is not necessarily present in the aluminum alloy matrix and can form reaction products at least partially coating the filler particles (such as, for example, $B_4C$ particles). As such, in the matrix of the composite material described herein, the Ti content can be below about 0.05 and even below about 0.01 (in weight percent).

In lieu of or in combination with Ti, as indicated in PCT/CA2013/050881 (published under WO2014/075194 on May 22, 2014), other additives can be used to react with the filler particles and increase the fluidity of the composite material during casting operations. Such additives include, but are not limited to, Cr (chromium), V (vanadium), Nb (niobium), Zr (zirconium), Sr (strontium), Sc (scandium) and any combination thereof.

Composite materials according to embodiments described herein can provide good strength over a wide range of temperatures and can provide increased strength relative to other alloys at high temperatures, particularly after long-term exposure to high temperatures. At room temperature, Mg—Si precipitation hardening is an effective mechanism for strengthening alloys as described herein, but its effect diminishes at higher temperatures, due to particle coarsening. Other strengthening mechanisms, such as dispersion strengthening and solid solution strengthening, are more thermally stable. The Mn, Fe and Si additions in the aluminum alloys of the present disclosure can produce an increased volume fraction of stable second phase particles such as Al—Fe—Mn—Si, which provide dispersion strengthening. Additionally, the aluminum alloys of the present disclosure contain excess Mg, which is not "tied up" in Mg—Si precipitates and instead, is in solid solution where it can provide solid solution strengthening. The dispersion strengthening and solid solution strengthening can achieve the increased high-temperature mechanical properties described herein, particularly when their effects are combined.

The composite material described herein may be used in forming a variety of different articles, and may be initially produced as a billet. The term "billet" as used herein may refer to round billets for extrusion as well as square or rectangular billets for rolling process. The term "billet" also includes ingots and other intermediate products that may be produced via a variety of techniques, including casting techniques such as continuous or semi-continuous casting and others.

Composite materials according to embodiments described herein may be further processed in creating products. For example, billets of the composite material may be heated at temperatures between 350-550° C. and then extruded into various profiles, which generally have a constant cross-sectional shape along their entire salable length. Extrusions of the alloy may be quenched, such as by air or water quenching, after extrusion but rapid quenching is not a prerequisite for the invention. Additional processing steps may be used in other embodiments, including processing steps known in the art such as stretching to improve straightness. It is understood that an extruded article may have a constant cross section in one embodiment, and may be further processed to change the shape or form of the article, such as by cutting, machining, connecting other components, or other techniques. Other forming techniques may additionally or alternately be used, including rolling, forging, or other working techniques.

Some of these techniques may also be used for processing composites using the alloy as a matrix. For example, a billet of such a composite may be cast from a melt, as described below. A resultant composite material may also be formed into a desired shape, such as by extrusion, rolling, forging, other working, machining, etc. The alloy, or a composite including the alloy, may also be shape-cast using a variety of different shape-casting techniques.

The embodiments of alloys described herein may be used to produce composite materials, with the alloy as the matrix material, in combination with a filler material. It is noted that the use of the term "matrix" does not imply that the alloy makes up a majority or a largest share of the weight, volume, etc., of the composite, unless otherwise specified. Instead, the matrix is the material in which the filler material is embedded and which binds the filler material together, and the matrix may be completely continuous in some embodiments.

In one embodiment, the composite material contains up to 20% volume fraction of the filler material, and the matrix material forms 80% or more of the volume fraction of the composite. For example, in a composite with a $B_4C$ filler material, the volume fraction of the filler material may be about 4%, 7%, 10.5%, 12%, 16%, or 17.5% in various embodiments. It is understood that, in one embodiment, the 20% volume fraction of the filler material mentioned above may reflect an aggregate volume fraction of multiple different filler materials, and in another embodiment, said 20% volume fraction may be a volume fraction for a single type of filler material (e.g., $B_4C$), and other types of filler materials may be present.

The filler material may be any of a variety of materials, including $B_4C$ and/or other ceramic materials, as well as other types of materials (e.g., silicon carbide (SIC) or alumina/aluminum oxide ($Al_2O_3$)). The filler material may have a higher melting point and/or a greater hardness than the aluminum alloy matrix in one embodiment. Additionally, the filler material may include multiple different materials or types of materials. It is understood that a multi-component filler material may have components where some or all have higher melting points and/or greater hardness than the alloy matrix. In one embodiment, a composite may utilize an alloy as described herein as a matrix material and $B_4C$ as a filler material. The $B_4C$ in such a composite can provide neutron absorption capability, while the alloy matrix can provide strength and allow the composite material to be formed into useful shapes by conventional metal forming techniques, such as rolling or extrusion. Other neutron absorbing and/or radiation shielding filler materials may be used in other embodiments, and it is understood that the filler material may have greater neutron absorption and radiation shielding capabilities than the matrix material, in one embodiment.

A composite material according to this embodiment may be utilized for storage, containment, shielding, etc., of spent nuclear fuel and other radioactive materials. For example, the composite can be used to manufacture containers, barriers, and/or other components for use in such applications. It is understood that the filler material may include $B_4C$ in combination with one or more other materials. In another embodiment, the filler material may include $Al_2O_3$ or SiC in combination with one or more other materials (e.g., $B_4C$). In addition, $B_4C$ and/or other filler materials may be used in the composite material to provide other beneficial properties, such as hardness, wear resistance, strength, different friction properties, different thermal or electrical properties, etc.

Composites using the aluminum alloy as a matrix may be produced in a variety of manners. In one embodiment, the alloy may be mixed with the filler material while the alloy is in liquid form, and then the composite may be produced by various casting/molding techniques thereafter. One such technique is described in U.S. Pat. No. 7,562,692, which is incorporated herein by reference in its entirety, and which utilizes techniques for maintaining fluidity of the molten mixture, such as by having at least 0.2% by weight titanium present in the mixture, or other techniques described therein. This technique is particularly useful for composites including $B_4C$ filler materials. In one embodiment, the molten matrix alloy includes at least 0.2 or 0.2 to 2.0, in weight percentage, titanium, which may be present in the alloy prior to melting or may be added to the melt itself, e.g., in the form of an Al—Ti master alloy, titanium containing granules or powders, etc. The $B_4C$ filler material is added to the melt, and the titanium reacts with the $B_4C$ to form a layer of a titanium-containing reaction products, such as titanium boride (e.g., $TiB_2$), on at least part of the surfaces of the $B_4C$ particles. The reaction product-layer may also contain other elements, such as carbon and/or aluminum. Most of the reaction products do not disperse in the matrix and resists further reaction between the $B_4C$ particles and the aluminum alloy matrix. Thus, the molten composite can be held for extended periods of time without loss of fluidity caused by the gradual formation of aluminum carbides and other compounds, which helps maintain fluidity of the molten mixture. The $B_4C$ particles may retain this reaction product-coating after solidification of the matrix. Generally, this method may be performed by preparing a mixture of an aluminum alloy matrix as described herein, including at least 0.2 or between 0.2 to 2, in weight percentage, Ti, and up to 20% by volume $B_4C$ particles, stirring the molten mixture to wet the aluminum alloy to the $B_4C$ particles and to distribute the particles throughout the volume of the melt, and then casting the molten mixture.

Other methods for forming the composite may be used as well. In another embodiment, the alloy may be infiltrated into the filler material, such as by providing the filler material in porous form (e.g., particulate form, porous preform, etc.) and melting the alloy to create infiltration. In a further embodiment, powder metallurgy techniques may be used, by combining particles of the alloy with particles of the filler material (e.g., $B_4C$, $Al_2O_3$ and/or SiC), and then heating/sintering to form the composite. Further different techniques may be used in other embodiments. It is understood that techniques described herein for producing alloy products may also be used in producing composites utilizing such alloys, such as water quenching after extrusion, etc.

The filler material may be provided in porous and/or particulate form for some or all of these forming embodiments.

The composite material can be obtained by a process which broadly includes providing the elements of the matrix, adding the particles to the matrix and casting the resulting composite material. The process can optionally include a step of extruding, rolling, homogenizing and/or heat-treating the composite material.

The present invention will be more readily understood by referring to the following example which is given to illustrate the invention rather than to limit its scope.

Example I

The bulk composition A listed in Table 1 ("initial composition") was batched at 740° C. in a 36 kg electric furnace and stirred using a graphite impeller. The furnace was sealed, a vacuum was applied and the $B_4C$ particles with a median particle size of 17.5 μm was injected into the liquid alloy to produce a 10.5% by volume composite material. After 5 minutes stirring, the vacuum was broken and the furnace opened. The liquid composite was held for 60-120 min. at 700-720° C. to simulate the length of a commercial DC casting batch and then the metal was poured into a 106 mm dia.×500 mm permanent steel mold and solidified to produce individual billets. The initial composition prior to the $B_4C$ powder addition contained a deliberate Ti addition of 1.0% Ti (w/w) to form a protective layer of Ti containing reaction compounds on the surface of the $B_4C$ particles to prevent further attack between the $B_4C$ and the aluminum matrix alloy and to maintain fluidity. The second analysis results in Table 1 ("After $B_4C$ addition") is for the alloy matrix after $B_4C$ mixing and holding and removal of the $B_4C$ particles in a liquid metal sample by filtration through a porous ceramic disc (known by the trade name PoDFA). In this way, any reaction layer on the particle surface is also removed such that this analysis is the actual matrix composition. In the composite material, the Ti content of the matrix was <0.01% (w/w), indicating that practically all the Ti added to the initial melt had reacted with the particulate. Without being bound to theory, it is stipulated that the slight presence of boron (B) in the initial melt was due to contamination in the furnace by a small amount of $B_4C$. In this experiment, the initial Mg content of the alloy prior to mixing was 0.77% (w/w), which resulted in 0.69% Mg (w/w) in the final matrix. Mg could be added before the particles addition and, in such instances, the fluidity after holding for 1 h. was sufficient to allow ingots to be cast.

TABLE 1

Material A Composition before and after $B_4C$ Particles Addition and Mixing. Measured by Optical Emission Spectroscopy (all values in weight percentage)

| Condition | Si | Fe | Cu | Mn | Mg | Cr | Ni | Zn | Ti | B |
|---|---|---|---|---|---|---|---|---|---|---|
| Initial composition | 0.71 | 0.47 | 0.08 | 0.73 | 0.77 | <0.01 | 0.01 | 0.02 | 0.42 | 0.04 |
| After $B_4C$ addition | 0.76 | 0.46 | 0.08 | 0.68 | 0.69 | <0.01 | 0.01 | 0.02 | <0.01 | <0.01 |

The resulting ingots were machined into 101.6 mm dia.× 200 mm long billets. The billets were homogenised for 2 h. at 560° C. and cooled at 350° C./hr. These were extruded into a 3×42 mm profile using a billet temperature of 480° C. and an exit speed of 34 m/min, which gave exit temperatures in the range 520-540° C. The billets were induction-heated (480° C.) to the extrusion temperature in 2 minutes. The profile was water-quenched and then aged for 8 hrs/170° C. Samples were then exposed for 100 hrs at 150, 200, 250 and 300° C. and tensile tested at the corresponding exposure temperatures according to ISO 6896-2: 2011(E).

The composition of material B is shown in Table 2. Material B was produced as a composite containing 10.5% volume $B_4C$ in the same manner as described above for material A. Table 2 shows the composition after initial batching ("Initial Composition") and after the addition of the $B_4C$ particles, holding for 60 min. and filtration of the particulate ("After $B_4C$ addition"). Again, the Mg was added during the initial batching prior to the particles addition. Extrusion billets were produced by the same method as described above. The initial Ti addition was 1.0% (w/w), the measured Ti concentration in the melt was 0.39% (w/w) and, after mixing, this had again fully reacted (calculated content of less than 0.01) to provide a protective Ti compound layer around the particles. The person skilled in the art will understand that precise measurement of this level of Ti is difficult by conventional OES. The Mg addition was made prior to the $B_4C$ particles addition and the mixture had sufficient fluidity after 60 m. to be cast into permanent molds. Fluidity testing using a standard K-mold (pre-heated at 425° C.) to cast a bar was conducted on a liquid sample of the composite taken from the furnace after 60 m. holding. Alloy B was capable of producing a cast bar length of 315 mm. Three billet heat treatments were applied: (i) as-cast (none), (ii) 4 h./550° C. and cooled at 300° C./h. or (iii) 24 h./375° C. and cooled at 300° C./h.

TABLE 2

Material B Composition before and after $B_4C$ Particles Addition and Mixing. Measured by Optical Emission Spectroscopy (wt %)

| Condition | Si | Fe | Cu | Mn | Mg | Cr | Ni | Zn | Ti | B |
|---|---|---|---|---|---|---|---|---|---|---|
| Initial composition | 0.24 | 0.41 | 0.14 | 1.1 | 0.99 | <0.01 | 0.01 | 0.02 | 0.39 | 0.01 |
| After $B_4C$ addition | 0.26 | 0.41 | 0.14 | 1.04 | 0.92 | <0.01 | 0.01 | 0.02 | <0.01 | <0.01 |

The billets were extruded into the same profile as described above, using a billet temperature of 430-440° C. and an exit speed of 8 m/min. The profile was air quenched at the press exit. Die exit temperatures ranged from 500-540° C. No further heat treatment was applied.

TABLE 3

Electrical Conductivity of material B

| Composite | Treatment | Billet | Extrusion |
|---|---|---|---|
| B | None | 24.3 | 28.9 |
| B | 4 hrs/550° C. | 31.8 | 32.54 |

Table 3 shows material B electrical conductivity values for the billet and extrusion. Conductivity is an indicator of the level of Mn in solid solution. The standard homogenisation and the 375° C. treatment gave similar conductivity values and indicate extensive precipitation of manganese occurred during homogenisation. These numbers did not change during extrusion, suggesting little dissolution of these particles took place. Although the similarity of the values for the two treatments indicates that Mn solid solution levels and volume fractions of Mn particles were similar, one would expect a higher particle density and finer particle size for the lower temperature treatment. In contrast, the as-cast billet had a lower conductivity due to retained Mn in solid solution but this value increased during extrusion, indicating significant precipitation took place during the rapid induction reheat and extrusion thermal cycle.

Table 4 and FIG. 1 compare the yield strength results for materials A and B from with the three billet treatments, as a function of exposure and test temperature. The Δ % values represent the strength increase or decrease relative to composite material A. Up to 200° C., material A exhibited the highest strength due, at least in part, to residual effects of the Mg—Si precipitate structure formed during the artificial ageing step. It is expected that the properties of material A at 150 and 200° C. would deteriorate with increased exposure time such as 1 000 h. due to coarsening and dissolution of this structure, which is typical behavior for 6XXX based alloys. At 250° C. or above, material B had a higher strength for all billet conditions giving an improvement (up to 18.2%) in yield strength compared to material A. The as-cast material ("none" in Table 4) overall gave the highest strength across the range of temperatures tested, followed by the 375° C. heat treatment and the 550° C. homogenisation.

TABLE 4

Yield Strength Results (MPa)

| Mat. | Treatment | 150° C. | Δ % | 200° C. | Δ % | 250° C. | Δ % | 300° C. | Δ % |
|---|---|---|---|---|---|---|---|---|---|
| A | 4 hrs/560° C. | 256.1 | 0.0 | 142.9 | 0.0 | 64.8 | 0.0 | 34.6 | 0.0 |
| B | None | 161.2 | −37.1 | 112.5 | −21.2 | 76.6 | 18.2 | 51.9 | 50.00 |
| B | 4 hrs/550° C. | 123.7 | −51.7 | 94.8 | −33.6 | 67.3 | 3.9 | 46.6 | 34.7 |
| B | 24 hrs/375° C. | 158.8 | −38.0 | 113.5 | −20.6 | 72.7 | 12.2 | 45.4 | 31.2 |

Figure 2:
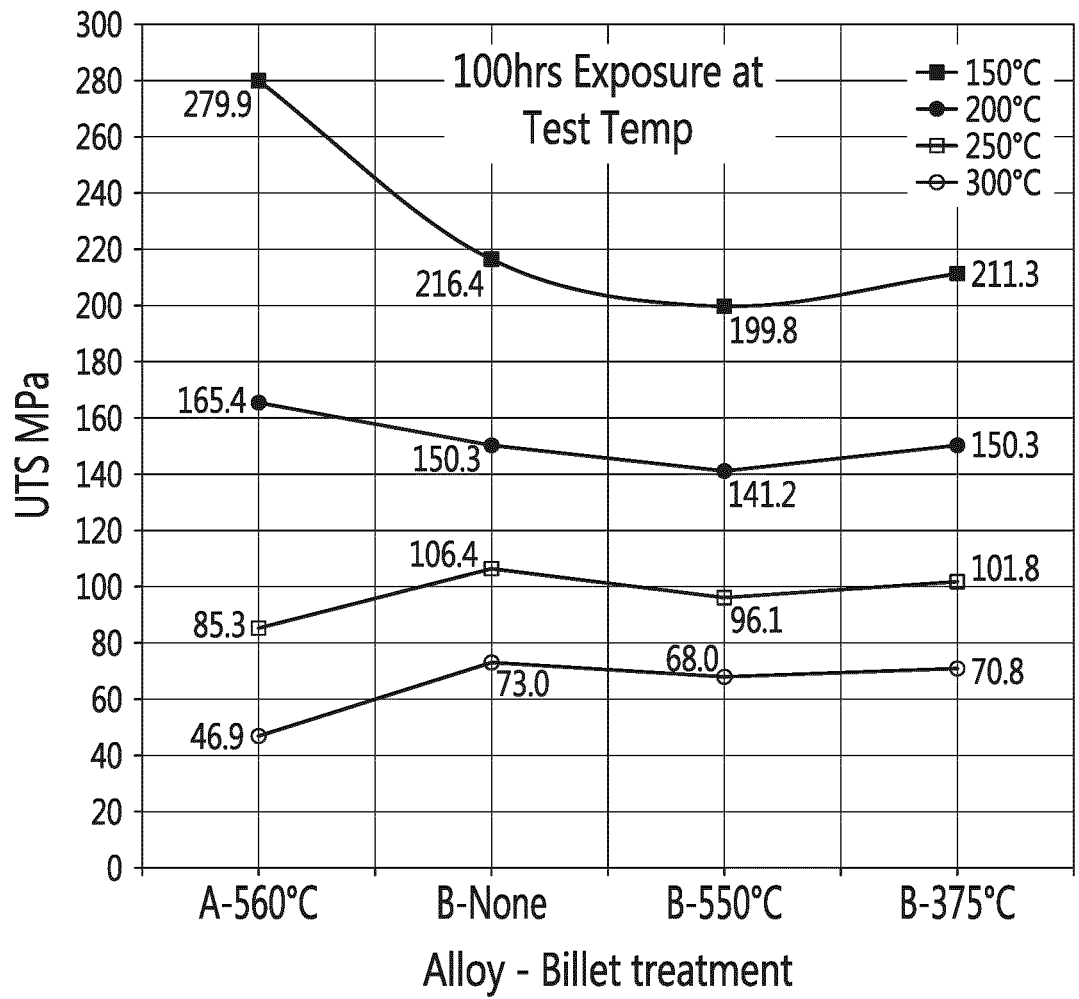
FIG. 2 provides a graphical representation of the tensile strength (in MPa) as a function of alloy (A or B), billet treatment (from left to right: 4 hrs/560° C.; none, 4 hrs/550° C. or 24 hrs/375° C.) and temperature exposure for 100 hours (■: 150° C., ●: 200° C., □: 250° C., ○: 300° C.).

The trends for tensile strength shown in Table 5 and FIG. 2 were similar, with material B variants exhibiting an improved strength of (up to 25%) over material A at 250° C. and above. Again, the as-cast material gave higher strength than the other treatments at 250° C. or higher.

TABLE 5

Tensile Strength Results (MPa)

| Mat. | Treatment | 150° C. | Δ % | 200° C. | Δ % | 250° C. | Δ % | 300° C. | Δ % |
|---|---|---|---|---|---|---|---|---|---|
| A | 4 hrs/560° C. | 279.9 | 0.0 | 165.4 | 0.0 | 85.3 | 0.0 | 46.9 | 0.0 |
| B | None | 216.4 | −22.7 | 153.9 | −7.0 | 106.4 | 24.7 | 73.3 | 55.7 |
| B | 4 hrs/550° C. | 199.8 | −28.6 | 141.2 | −14.7 | 96.1 | 12.7 | 68.0 | 45.0 |
| B | 24 hrs/375° C. | 211.3 | −24.5 | 150.3 | −9.2 | 101.8 | 19.3 | 70.8 | 51.0 |

Therefore, the matrix material of material B for the production of a 10.5 volume % Al—$B_4C$ composite material that, when processed into an extrusion, has improved elevated temperature properties at 250° C. or higher as compared to currently available 6XXX materials. When used with an initial Ti addition of 0.5-5.0% (w/w) or an initial melt concentration of 0.2 to 1.0% Ti (w/w, mass balance), the material maintains excellent fluidity over commercial production timescales and can therefore be produced commercially by a DC casting route. Mg can be successfully added before the addition of $B_4C$ particles. The cast billet can be processed with a homogenisation cycle of 550° C. or less to produce a suitable microstructure for elevated temperature strength, or alternatively for optimum strength at 250° C. or above, as-cast billet can be extruded in combination with an induction or gas fired preheat to a billet temperature in the range 350-550° C.

Example II

The bulk composition composite material C listed in Table 6 with an addition of 10.5 volume % $B_4C$ was produced according to the procedure described in Example I. The initial composition prior to the $B_4C$ powder injection contained a deliberate addition of Mo. There was some decrease in the Mo content between the pre-$B_4C$ addition value and the post $B_4C$ and filtration value suggesting there was some loss of this element to Mo containing primary phases. This was confirmed by subsequent optical metallography. The liquid composite material after holding for 60 min. was capable of producing a cast bar length of 315 mm in the standard K-mold test described in Example I.

TABLE 6

Composition of composite material C before and after $B_4C$ particle addition and mixing. Measured by OES (all values in wt %). After B4C particles were added, the composite material was mixed, filtrated and hold for 60 min.

| Condition | Si | Fe | Cu | Mn | Mg | Cr | Ni | Zn | Ti | B | Mo |
|---|---|---|---|---|---|---|---|---|---|---|---|
| Initial composition | 0.26 | 0.33 | <.01 | 1.09 | 1.01 | <.01 | 0.01 | 0.01 | 0.29 | 0.02 | 0.24 |
| After $B_4C$ addition | 0.29 | 0.32 | <.01 | 0.97 | 0.95 | <.01 | 0.01 | 0.01 | <.01 | 0.02 | 0.18 |

The composite material was cast into 101-mm diameter billets in a preheated permanent mould.

The following heat treatments were applied to the billets:
"As cast", i.e. no heat treatment;
24 h/375° C.; or
12 h/250° C. and 24 h/375° C.

The control and heat treated billets were extruded into a 7×25 mm profile using a billet temperature of ~500° C. and an exit speed of 20 m/min. Die exit temperatures were approximately 550° C. Lengths of the extrusion were exposed at 300° C. for 100 h and then tensile tested at 300° C. The tensile properties are listed in Table 7 in comparison to composite material B (described in Example I).

TABLE 7

Tensile properties at 300° C. (YS = yield strength; UTS = ultimate tensile strength, both in MPa) of composite material C compared to composite material B in control and heat treated cast products.

|  | C YS | B YS | C UTS | B UTS |
|---|---|---|---|---|
| 24/375° C. | 53.2 | 45.4 | 73.3 | 70.8 |
| Cast | 48.3 | 51.9 | 68.5 | 73.3 |
| 12/250° C. + 24/375° C. | 53.3 |  | 75.1 |  |

The Mo addition gave a useful yield strength increase at 300° C. of about 2% compared to composite material B but only for the billets homogenized for 24 h. at 375° C. In the case of the billets where no treatment was applied prior to extrusion the Mo containing material was slightly softer. The reasons for this behavior are not currently understood but, without being bound to theory, Mo has a very low diffusivity in aluminum and it is believed that it would be possible that the extended treatment at 375° C. is required to cause precipitation of Mo containing dispersoids. The duplex homogenization treatment where a 12 h/250° C. soak was applied prior to holding at 375° C. did not provide any significant further improvement in strength.

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. A composite material comprising:
   (i) a matrix of an aluminum alloy comprising, in weight percent:
   Si 0.05-0.30,
   Fe 0.04-0.6,
   Mn 0.80-1.50,
   Mg 0.80-1.50,
   Cu 0.20 max, and
   the balance being aluminum and unavoidable impurities; and
   (ii) particles of a filler material dispersed within the matrix, wherein the filler material is $B_4C$, the particles are at least partially coated with a reaction product between an additive and B, and the additive is selected from the group consisting of Ti, Cr, Mo, V, Nb, Zr, Sr, Sc and any combination thereof.

2. The composite material of claim 1, wherein the additive is Ti.

3. The composite material of claim 2 obtained by adding between 0.20 to 2.00, in weight percent, of Ti to the aluminum alloy prior to addition of particles to the composite material.

4. The composite material of claim 2 obtained by adding about 1.0, in weight percent, of Ti to the aluminum alloy prior to addition of particles to the composite material.

5. The composite material of claim 1, wherein the matrix further comprises Mo.

6. The composite material of claim 5, wherein the Mo content of the matrix is 0.25 maximum, in weight percent.

7. The composite material of claim 1, wherein the Si content of the matrix is 0.05-0.26, in weight percent.

8. The composite material of claim 1, wherein the Fe content of the matrix is 0.04-0.40, in weight percent.

9. The composite material of claim 1, wherein the Mn content of the matrix is 0.90-1.50, in weight percent.

10. The composite material of claim 1, wherein the Mg content in the matrix is 1.00-1.50, in weight percent.

11. The composite material of claim 1, wherein the filler material has a volume fraction of up to 20% in the composite material.

12. The composite material of claim 1, wherein the matrix includes excess Mg that is in solid solution at room temperature.

13. The composite material of claim 1, wherein the composite material has been homogenized at a temperature of 375° C. to 560° C. for up to 24 hours.

14. A method comprising:
  (i) preparing a molten aluminum alloy by combining, in weight percent:
    Si 0.05-0.30,
    Fe 0.04-0.6,
    Mn 0.80-1.50,
    Mg 0.80-1.50,
    Cu 0.20 max,
    an additive selected from the group consisting of Ti, Cr, Mo, V, Nb, Zr, Sr, Sc and any combination thereof, and
    the balance being aluminum and unavoidable impurities;
  (ii) adding particles of a filler material to the molten aluminum alloy to form a molten mixture having the filler material dispersed throughout the molten aluminum alloy, wherein the filler material is $B_4C$ and the particles are at least partially coated with a reaction product between the additive and B; and
  (iii) casting the molten mixture to form a composite material to obtain an as-cast billet.

15. The method of claim 14, further comprising extruding or rolling the as-cast billet to obtain an extruded or rolled product.

16. The method of claim 14, further comprising homogenizing the as-cast billet to obtain an homogenized product.

17. The method of claim 16, further comprising extruding or rolling the homogenized product to obtain an extruded or rolled product.

18. The method of claim 15, comprising further heat-treating the extruded or rolled product at a temperature between 350° C. and 400° C. and for a period of time between 2 to 30 hours.

19. The method of claim 14, further comprising, prior to step (iii), stirring the molten mixture to wet the aluminum alloy to the particles of the filler material and to distribute the particles throughout a volume of the molten mixture.

20. A composite material obtained by the method of claim 14.

21. The composite material of claim 20 being an extruded product.

22. The composite material of claim 20 being a rolled product.

* * * * *